United States Patent
Shalom et al.

(10) Patent No.: US 12,255,828 B2
(45) Date of Patent: Mar. 18, 2025

(54) QOS FOR MULTIPLEX NETWORK RECEIVE QUEUE

(71) Applicant: MELLANOX TECHNOLOGIES, LTD., Yokneam (IL)

(72) Inventors: Gal Shalom, Givat-Avni (IL); Omri Kahalon, Tel Aviv (IL); Aviad Yehezkel, Yokneam Illit (IL); Yossi Kuperman, Haifa (IL); Roni Bar Yanai, Even Yehuda (IL)

(73) Assignee: Mellanox Technologies, Ltd, Yokneam (IL)

( * ) Notice: Subject to any disclaimer, the term of this patent is extended or adjusted under 35 U.S.C. 154(b) by 217 days.

(21) Appl. No.: 18/113,100

(22) Filed: Feb. 23, 2023

(65) Prior Publication Data
US 2024/0291766 A1   Aug. 29, 2024

(51) Int. Cl.
| | |
|---|---|
| H04L 47/31 | (2022.01) |
| H04L 47/215 | (2022.01) |
| H04L 47/62 | (2022.01) |
| H04L 47/629 | (2022.01) |
| H04L 49/00 | (2022.01) |

(52) U.S. Cl.
CPC ............ *H04L 47/31* (2013.01); *H04L 47/215* (2013.01); *H04L 47/622* (2013.01); *H04L 47/629* (2013.01); *H04L 49/3009* (2013.01)

(58) Field of Classification Search
CPC ..... H04L 47/31; H04L 47/215; H04L 47/622; H04L 47/629; H04L 49/3009
See application file for complete search history.

(56) References Cited

U.S. PATENT DOCUMENTS

| | | |
|---|---|---|
| 6,751,663 B1 | 6/2004 | Farrell et al. |
| 7,787,472 B2 | 8/2010 | Washburn et al. |
| 8,045,470 B2 | 10/2011 | Zseby |
| 8,705,365 B1 | 4/2014 | Martin et al. |
| 8,856,518 B2 | 10/2014 | Sridharan et al. |
| 9,331,947 B1 | 5/2016 | O'Keeffe et al. |
| 9,450,881 B2 | 9/2016 | Dumitrescu et al. |
| 9,942,158 B2 | 4/2018 | Shetty et al. |
| 10,181,987 B2 | 1/2019 | Grandham et al. |

(Continued)

FOREIGN PATENT DOCUMENTS

WO   2020212308 A1   10/2020

OTHER PUBLICATIONS

Heinanen et al., "A Single Rate Three Color Marker," Request for Comments (RFC) 2697, The Internet Society, pp. 1-7, Sep. 1999.

(Continued)

*Primary Examiner* — Alex Skripnikov
(74) *Attorney, Agent, or Firm* — Meitar Patents Ltd.; Daniel Kligler (57) ABSTRACT

In one embodiment, a network device, including a network interface to receive packets over a packet data network, and a hierarchical policer to provide queue fairness for a plurality of network flows competing for access to a multiplex network receive queue, and including level one meters to label the received packets, a level two meter to receive at least some of the labeled packets and relabel the at least some labeled packets, and queueing logic add the packets labeled with a first label-type to the multiplex network receive queue and drop the packets labeled with a third label-type.

17 Claims, 9 Drawing Sheets

(56) References Cited

U.S. PATENT DOCUMENTS

| | | |
|---|---|---|
| 10,237,354 B2 | 3/2019 | Jani |
| 10,341,263 B2 | 7/2019 | Zou et al. |
| 10,432,745 B2 | 10/2019 | Daly et al. |
| 10,680,964 B1 | 6/2020 | Kadosh et al. |
| 10,924,418 B1 | 2/2021 | Gudibanda et al. |
| 11,310,163 B1 | 4/2022 | Lo et al. |
| 11,470,007 B2 | 10/2022 | Urman et al. |
| 11,516,135 B2 | 11/2022 | Aibester et al. |
| 11,558,304 B2 | 1/2023 | Lo et al. |
| 11,621,920 B2 | 4/2023 | Urman et al. |
| 2004/0081095 A1 | 4/2004 | Liu et al. |
| 2005/0160180 A1 | 7/2005 | Rabje et al. |
| 2006/0221819 A1 | 10/2006 | Padwekar |
| 2009/0109847 A1 | 4/2009 | Stephenson et al. |
| 2010/0150004 A1 | 6/2010 | Duffield et al. |
| 2011/0080886 A1 | 4/2011 | Chandrachood et al. |
| 2011/0096666 A1* | 4/2011 | Davari ............... H04L 47/215 370/235 |
| 2012/0054363 A1 | 3/2012 | Hart |
| 2015/0006755 A1 | 1/2015 | Turlington et al. |
| 2015/0085694 A1 | 3/2015 | Agarwal et al. |
| 2016/0262073 A1 | 9/2016 | Muley et al. |
| 2017/0177222 A1 | 6/2017 | Singh et al. |
| 2019/0058641 A1 | 2/2019 | Mirzazad Barijough et al. |
| 2020/0358674 A1 | 11/2020 | Harikrishnan et al. |
| 2021/0084530 A1 | 3/2021 | Song et al. |
| 2021/0117360 A1 | 4/2021 | Kutch et al. |
| 2022/0368639 A1 | 11/2022 | Aibester et al. |

OTHER PUBLICATIONS

Heinanen et al., "A Two Rate Three Color Marker," Request for Comments (RFC) 2698, The Internet Society, pp. 1-6, Sep. 1999.

Hahne et al., "Dynamic Queue Length Thresholds for Multiple Loss Priorities," IEEE/ACM Transactions on Networking, vol. 10, No. 3, pp. 368-380, Jun. 2002.

Claise et al., "Specification of the IP Flow Information Export (IPFIX) Protocol for the Exchange of Flow Information," Request for Comments (RFC) 7011, Internet Engineering Task Force (IETF), pp. 1-77, Sep. 2013.

Aboul-Magd et al., "A Differentiated Service Two-Rate, Three-Color Marker with Efficient Handling of in-Profile Traffic," Request for Comments (RFC) 4115, The Internet Society, pp. 1-6, year 2005.

* cited by examiner

QOS FOR MULTIPLEX NETWORK RECEIVE QUEUE

FIELD OF THE INVENTION

The present invention relates to computer systems, and in particular, but not exclusively, to providing queue fairness.

BACKGROUND

In the producer-consumer software model, there two entities, a producer and consumer. The producer produces objects, e.g., items in a queue, and the consumer consumes the objects, e.g., the items from the queue. Providing a separate queue for each producer-consumer pair provides a fair solution. However, the memory footprint of the queues grows linearly with the number of consumers.

A solution to the above problem is to provide a queue shared by a number of producers and consumers thereby reducing the memory footprint. However, the shared queue leads to a problem of fairness in which the consumers compete for use of the queue as heavy producers exclude light producers from adding to the queue based on the high volume of objects provided by one or more of the producers.

SUMMARY

There is provided in accordance with an embodiment of the present disclosure, a network device, including a network interface to receive packets over a packet data network, and a hierarchical policer to provide queue fairness for a plurality of network flows competing for access to a multiplex network receive queue, and including level one meters to label the received packets, a level two meter to receive at least some of the labeled packets and relabel the at least some labeled packets, and queueing logic add the packets labeled with a first label-type to the multiplex network receive queue and drop the packets labeled with a third label-type.

There is also provided in accordance with another embodiment of the present disclosure, a network device, including a network interface to receive packets over a packet data network, and packet processing circuitry to manage a multiplex network receive queue, and including a hierarchical policer to provide queue fairness for a plurality of network flows competing for access to the multiplex network receive queue, the hierarchical policer including a plurality of level one meters to label the received packets with corresponding labels selected from labels of three label-types, a first level one meter of the level one meters being to selectively label packets of a first network flow the three label-types, a second level one meter of the level one meters being to selectively label packets of a second network flow the three label-types, a level two meter to receive at least some of the labeled packets output by the level one meters and relabel the at least some labeled packets, and queueing logic to selectively add the packets labeled with a first label-type or a second label-type of the three label-types to the multiplex network receive queue, and drop the packets labeled with a third label-type of the three label-types.

Further in accordance with an embodiment of the present disclosure the hierarchical policer is to provide the queue fairness for the network flows so that each of the network flows competing for access to the multiplex network receive queue is provided at least a minimal access to the multiplex network receive queue.

Still further in accordance with an embodiment of the present disclosure the level one meters are to label the received packets the three label-types based on available level-one-meter credits for the first label-type and the second label-type, and the level two meter is to relabel some of the labeled packets based on a current labeling of the labeled packets and available level-two-meter credits for the first label-type and the second label-type.

Additionally in accordance with an embodiment of the present disclosure the packet processing circuitry is to consume the available level-one-meter credits and the available level-two-meter credits a bandwidth of the packets.

Moreover, in accordance with an embodiment of the present disclosure the packet processing circuitry is to periodically replenish the available level-one-meter credits and the available level-two-meter credits.

Further in accordance with an embodiment of the present disclosure the packet processing circuitry is to consume the available level-one-meter credits and the available level-two-meter credits a number of the packets.

Still further in accordance with an embodiment of the present disclosure the packet processing circuitry is to add back consumed ones of the level-one-meter credits and the level-two-meter credits responsively to respective ones of the packets being consumed from the multiplex network receive queue.

Additionally in accordance with an embodiment of the present disclosure the packet processing circuitry is to configure a number of the available level-one-meter credits and the available level-two-meter credits so that the packets labeled with the first label-type by the level one meters retain the first label-type after the relabeling by the level two meter.

Moreover in accordance with an embodiment of the present disclosure the hierarchical policer is to provide the queue fairness for the network flows so that each of the network flows competing for access to the multiplex network receive queue is provided at least a minimal access to the multiplex network receive queue based on packets labeled with the first label-type by the level one meters retaining the first label-type after the relabeling by the level two meter.

Further in accordance with an embodiment of the present disclosure the packet processing circuitry is to configure the available level-one-meter credits and the available level-two-meter credits so that some of the packets labeled with the second label-type by the level one meters are relabeled with the third label-type by the level two meter.

There is also provided in accordance with still another embodiment of the present disclosure, a network method, including receiving packets over a packet data network, managing a multiplex network receive queue, providing queue fairness for a plurality of network flows competing for access to the multiplex network receive queue using a hierarchical policer, labeling the received packets with corresponding labels selected from labels of three label-types by a plurality of level one meters including a first level one meter and a second level one meter, selectively labeling packets of a first network flow the three label-types by the first level one meter, selectively labeling packets of a second network flow the three label-types by the second level one meter, receiving at least some of the labeled packets output by the level one meters, relabeling the at least some labeled packets, and selectively adding the packets labeled with a first label-type or a second label-type of the three label-types to the multiplex network receive queue and dropping the packets labeled with a third label-type of the three label-types.

Still further in accordance with an embodiment of the present disclosure the providing includes providing the queue fairness for the network flows so that each of the network flows competing for access to the multiplex network receive queue is provided at least a minimal access to the multiplex network receive queue.

Additionally in accordance with an embodiment of the present disclosure the labeling includes labeling the received packets the three label-types based on available level-one-meter credits for the first label-type and the second label-type, and the relabeling includes relabeling some of the labeled packets based on a current labeling of the labeled packets and available level-two-meter credits for the first label-type and the second label-type.

Moreover in accordance with an embodiment of the present disclosure, the method includes consuming the available level-one-meter credits and the available level-two-meter credits a bandwidth of the packets.

Further in accordance with an embodiment of the present disclosure, the method includes periodically replenishing the available level-one-meter credits and the available level-two-meter credits.

Still further in accordance with an embodiment of the present disclosure, the method includes consuming the available level-one-meter credits and the available level-two-meter credits a number of the packets.

Additionally in accordance with an embodiment of the present disclosure, the method includes adding back consumed ones of the level-one-meter credits and the level-two-meter credits responsively to respective ones of the packets being consumed from the multiplex network receive queue.

Moreover in accordance with an embodiment of the present disclosure, the method includes configuring a number of the available level-one-meter credits and the available level-two-meter credits so that the packets labeled with the first label-type by the level one meters retain the first label-type after the relabeling by the level two meter.

Further in accordance with an embodiment of the present disclosure the providing includes providing the queue fairness for the network flows so that each of the network flows competing for access to the multiplex network receive queue is provided at least a minimal access to the multiplex network receive queue based on packets labeled with the first label-type by the level one meters retaining the first label-type after the relabeling by the level two meter.

Still further in accordance with an embodiment of the present disclosure the configuring includes configuring the available level-one-meter credits and the available level-two-meter credits so that some of the packets labeled with the second label-type by the level one meters are relabeled with the third label-type by the level two meter.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

As previously mentioned, implementing a shared queue in a producer-consumer software model may lead to a problem of fairness for the consumers. For example, when multiple virtual machines (VMs) share the same network queue there is a possibility that one of the VM connections may starve the other VMs. In that example, network connections or the VMs are considered producers and the network queue is considered the consumer. One solution is to determine when a producer is allowed to insert an object into a queue or not. In software, this may be provided using an "if" statement, for example. However, in the case of receiving packets, hardware places the packets in a receive queue. In hardware, it is harder to provide queue fairness, and the decision whether a producer is to be limited needs to be made before a packet is consumed by a consumer, e.g., before a packet is placed on the receive queue. In many cases, queue fairness is not provided using congestion control algorithms as there may not be congestion on the network. For example, a queue can hold 1 GB/s, whereas a link feeding that queue may have a bandwidth of more than 100 GB/s. Therefore, in such a case there may be no need to control the network connection, but there may be a need to control access to the queue.

Additionally, while applying fairness, the different loads on the queue should be considered. For example, if three producers are adding to the queue, then the capacity of the queue should be divided among the three producers. However, if only a single producer is adding to the queue, then most of the capacity of the queue should be allocated to that single producer.

Embodiments of the present invention provide queue fairness for network flows competing for access to a multiplex network receive queue using a hierarchical policer. The hierarchical policer includes two levels of meters. The first level includes a meter for each network flow and each meter labels incoming packets according to available credits, so that some packets are labeled type-1 (e.g., green) according to available type-1 credits, some packets are labeled type-2 (e.g., yellow) according to available type-2 credits (when type-1 credits are not available), and some packets are labeled type-3 (e.g., red) when type-1 credits and type-2 credits are not available. The type-3 (e.g., red) packets are dropped, and the type-1 (e.g., green) and type-2 (e.g., yellow) packets are provided as input to a meter in the second level of the hierarchical policer.

The second level meter relabels the packets according to the following logic. If the packet is already labeled type-1 (e.g., green), then that packet is relabeled type-1 (e.g., green) according to available type-1 credits by the second level meter. In this context the term "relabel" may include actually relabeling the packet with a new label or validating the previous labeling of the packet. The second level meter credits are typically configured so that type-1 (e.g., green)

packets arriving at the second level meter remain type-1 (e.g., green) packets. However, in some embodiments, according to the logic of the second level meter, if for some reason no type-1 credits are available in the second level meter, a type-1 (e.g., green) packet could be relabeled by the second level meter as a type-2 (e.g., yellow) packet, or even as a type-3 packet if no type-2 credits are available.

If the packet arriving at the second level meter is already labeled type-2 (e.g., yellow), then that packet is relabeled type-2 (e.g., yellow) by the second level meter according to available type-2 credits. If no type-2 credits are available in the second level meter, the type-2 (e.g., yellow) packet could be relabeled as a type-3 by the second level meter. Packets labeled as type-1 (e.g., green) or type-2 (e.g., yellow) by the second level meter are added to the queue, whereas packets labeled as type-3 are dropped.

The initial level of type-1 credits allocated to the second level meter is configured to be the sum of the type-1 credits allocated to the first level meters so that all the packets labeled as type-1 (e.g., green) remain type-1 (e.g., green) after the second level meter, thereby guaranteeing a minimum access to the queue by each of the network flows. In other words, generally all packets labeled as type-1 (e.g., green) by the first level meters will eventually be added to the queue, and some of the packets labeled as type-2 (e.g., yellow) will be added to the queue while some will be dropped.

Using two levels of meters and three types of packet labeling allows providing queue fairness when all the network flows are active. It also allows unused queue capacity to be reassigned to one or more active network flows when one or more other network flows are less active or not active at all. For example, if all network flows are active then more of the type-2 labeled packets will be relabeled by the second level meter as type-3 and dropped. However, if one or more of the network flows is less active, or inactive, then less of the type-2 labeled packets of the more active flows will be relabeled by the second level meter, thereby adding more of the type-2 packets to the queue.

In some embodiments, the hierarchical policer may be configured as a bandwidth hierarchical policer wherein the credits are bandwidth credits. For example, for one of the meters, the type-1 credits may be initially set to equal X GB (Giga Bytes) and type-2 credits may initially be set to equal Y GB. The credits may be consumed against the size of the packets. For example, if a packet has a size A, and that packet is labeled according to a type-1 label, then the type-1 credits are reduced by A. The credits are replenished on a periodic basis, for example by adding back X GB per second to the type-1 credits, and Y GB per second to the type-2 credits.

In some embodiments, the hierarchical policer may be configured as a token hierarchical policer wherein the credits are equal to a number of packets or a number of places in the queue. For example, for one of the meters, the type-1 credits may be initially set to equal X packets and type-2 credits may initially be set to equal Y packets. The credits may be consumed against the number of packets. For example, if a packet is labeled according to a type-1 label, then the type-1 credits are reduced by 1. The credits are replenished based on the packets being consumed from the queue as described in disclosed embodiments.

System Description

Figure 1:
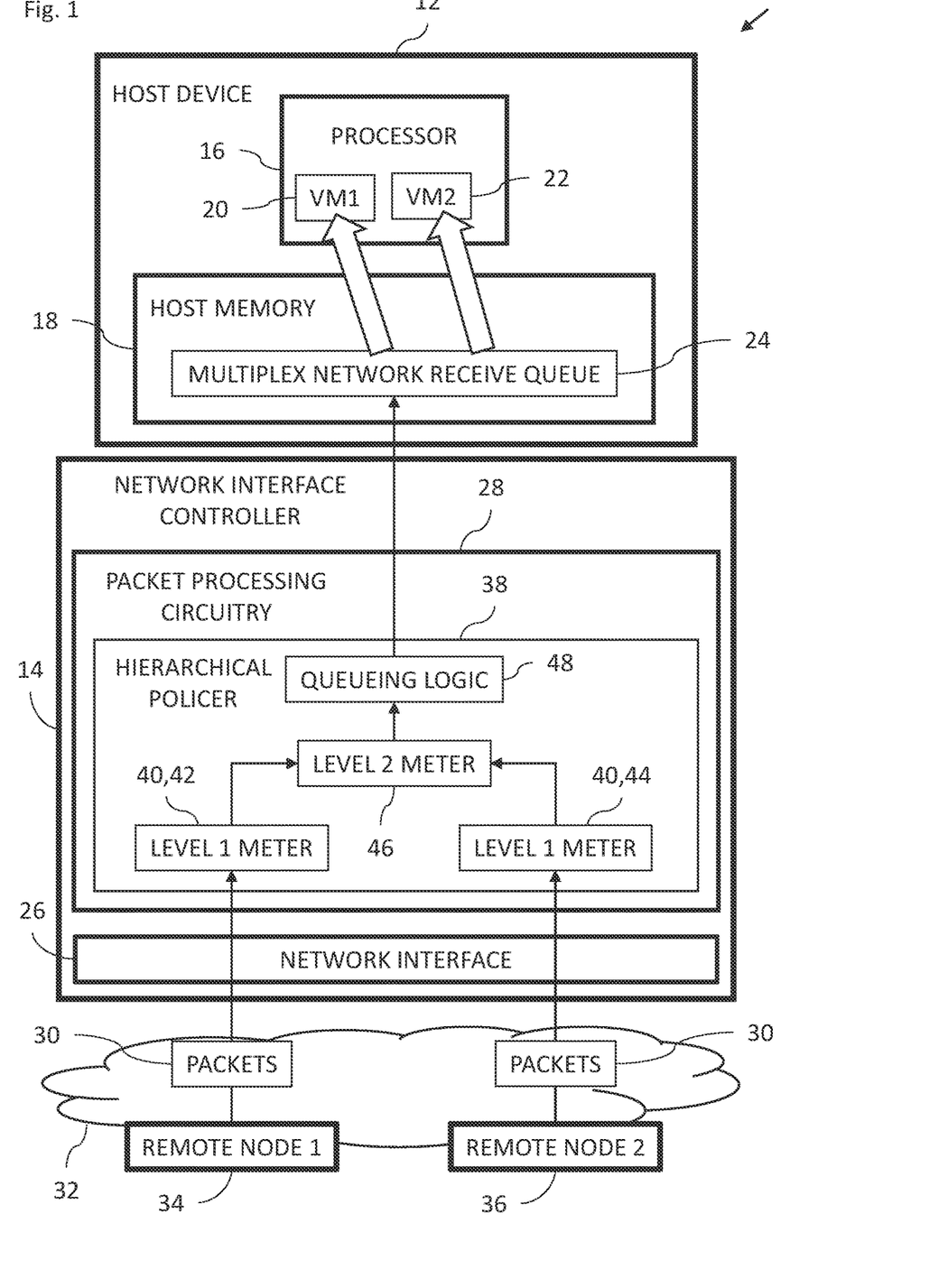
FIG. 1 is a block diagram view of a computer system constructed and operative in accordance with an embodiment of the present invention.

Reference is now made to FIG. 1, which is a block diagram view of a computer system 10 constructed and operative in accordance with an embodiment of the present invention. The system 10 includes a host device 12 and a network interface controller 14. In some embodiments, the network interface controller 14 may be replaced by any suitable network device. The host device 12 includes a processor 16 and a host memory 18. The processor 16 may be configured to run virtual machines (VMs), including a VM 20 and a VM 22. The host memory 18 may store a multiplex network receive queue 24, described in more detail below.

The network interface controller 14 includes a network interface 26 and packet processing circuitry 28. The network interface 26 and the packet processing circuitry 28 may be implemented using one or more application-specific integrated circuits (ASICs). The network interface 26 is configured to receive packets 30 over a packet data network 32 from remote nodes, such as a remote node 34 and a remote node 36. The packets 30 received from remote node 34 represent one network flow, and the packets 30 received from remote node 36 represent another network flow. A "network flow" is typically identified by the values of a specified set of header fields, such as the IP and TCP/UDP 5-tuple of source and destination addresses, source and destination ports, and protocol, or any suitable flow information such as layer 2, 3, 4 or tunnel data, which are consistent over all of the packets in the flow.

The packet processing circuitry 28 is configured to process the packets 30 received from the remote nodes and manage the multiplex network receive queue 24. The packet processing circuitry 28 may include a physical (PHY) layer unit, a MAC unit, and a hierarchical policer 38 to provide queue fairness for the network flows competing for access to the multiplex network receive queue 24.

The hierarchical policer 38 is configured to provide queue fairness for the network flows so that each of the network flows competing for access to the multiplex network receive queue 24 is provided at least a minimal access to the multiplex network receive queue 24. The hierarchical policer 38 includes a plurality of level one meters 40 to label the received packets 30 with corresponding labels selected from labels of three label-types (type-1, type-2, type-3). Labeling the packets 30 may be achieved by adding or updating flags or other data items in the headers of the packets 30. Each of the level one meters 40 labels packets of one network flow and each of the packets is labeled with one of the label types. FIG. 1 shows an example of two level one meters 40, level one meter 42, and level one meter 44. The hierarchical policer 38 may include any suitable number of level one meters 40.

The level one meter 42 is configured to selectively label packets 30 (from remote node 34) of one network flow according to the three label-types. The level one meter 44 is configured to selectively label packets 30 (from remote node 36) of another network flow according to the three label-types. Each of the packets 30 is labeled with one of the label types.

The hierarchical policer 38 includes a level two meter 46 configured to receive at least some of the packets output by, and labeled by, the level one meters 40. It should be notes that packets labeled as type-3 by the level one meters 40 may be dropped prior to reaching the level two meter 46. The level two meter 46 is configured to relabel the packets 30 it receives. The term "relabel" as used in the specification and claims, in all grammatical forms, may include relabeling (i.e., changing a label) of a packet with a different label type, or relabeling the packet with the same label type (i.e., overwriting the existing label with the same label, or validating the existing label of the packet by leaving the existing label in place without overwriting the existing label).

The hierarchical policer 38 includes queueing logic 48 to selectively add the packets 30 labeled with a type-1 label or label type-2 to the multiplex network receive queue 24, and drop the packets labeled with a type-3 label.

In practice, some or all of the functions of the packet processing circuitry 28 may be combined in a single physical component or, alternatively, implemented using multiple physical components. These physical components may comprise hard-wired or programmable devices, or a combination of the two. In some embodiments, at least some of the functions of the packet processing circuitry 28 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 2:
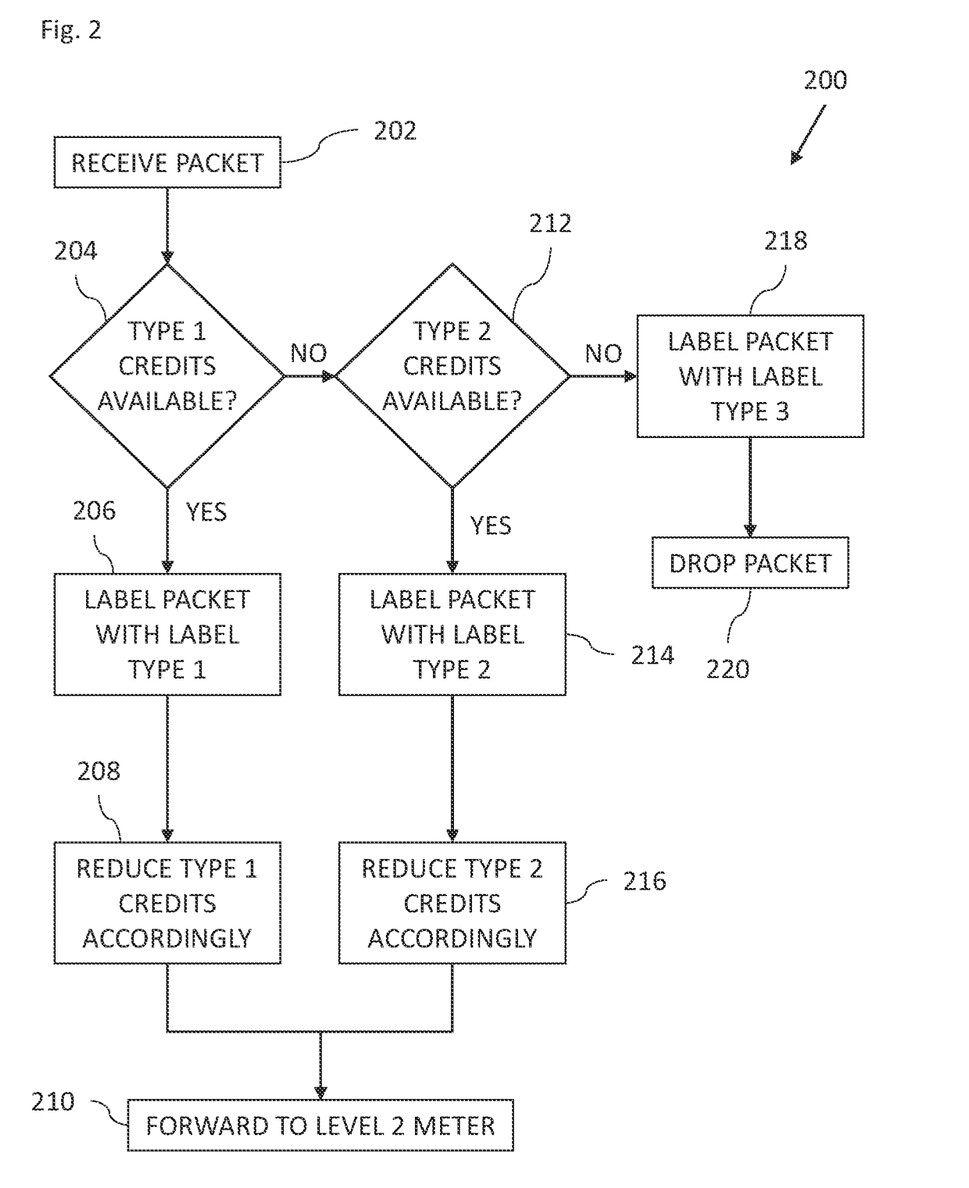
FIG. 2 is a flowchart including steps in a method of operation of a level 1 meter in the system of FIG. 1.

Reference is now made to FIG. 2, which is a flowchart 200 including steps in a method of operation of one of the level 1 meters 40 in the system 10 of FIG. 1. Reference is also made to FIG. 1. In general, the level one meters 40 are configured to label the received packets 30 according to the three label-types (type-1, type-2, and type-3) based on available level-one-meter credits for the first label-type and the second label-type. Each level one meter 40 has its own allocation of level-one-meter credits for both type-1 and type-2 credits.

Operation of the level one meter 40 is now described in more detail below. One of the packets 30 is received and it is directed by the network interface 26 to one of the level one meters 40 according to the network flow in which that received packet 30 is included.

The level one meter 40 is configured to receive the packet 30 (block 202). At a decision block 204, the level one meter 40 determines if there are enough available type-1 credits to assign a given amount of the available type-1 credits to the received packet 30. For example, if the credits are bandwidth based, then the level one meter 40 compares the size of the packet 30 with the value of the available type-1 credits. If the value of the available type-1 credits is greater than the size of the packet 30, then there are enough available type-1 credits to assign a given amount of the available type-1 credits to the received packet 30. If the credits are tokens corresponding to packets or places in the multiplex network receive queue 24, then if the value of the available type-1 credits is greater than zero, then there are enough available type-1 credits to assign 1 credit to the received packet 30.

Figure 3:
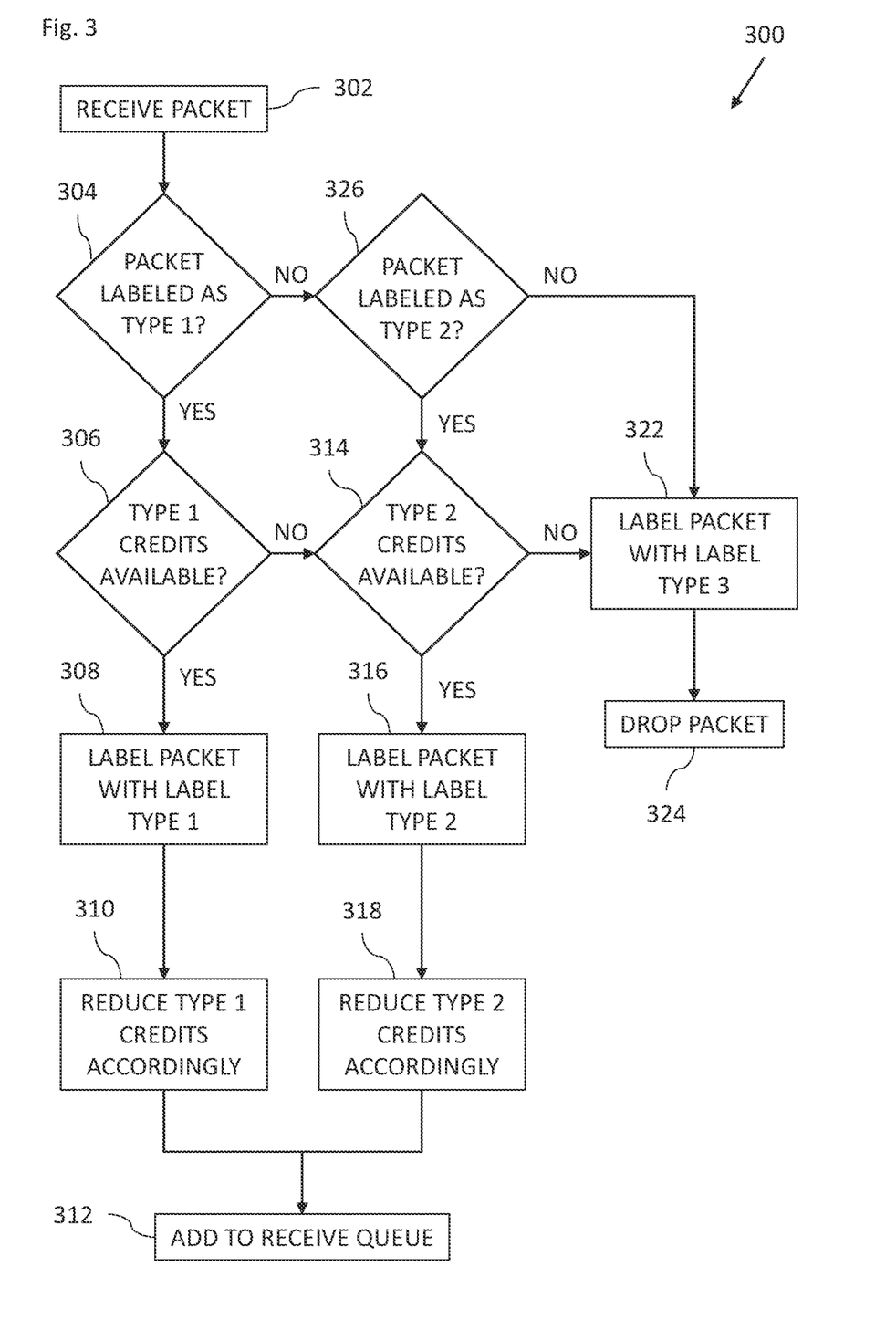
FIG. 3 is a flowchart including steps in a method of operation of a level 2 meter in the system of FIG. 1.

If there are enough available type-1 credits to assign a given amount of the available type-1 credits to the received packet 30, the level one meter 40 is configured to label the packet 30 with a type-1 label (block 206), reduce the number of available type-1 credits accordingly by the given amount of the available type-1 credits assigned to the received packet 30 (block 208), and forward the labeled packet 30 to the level two meter 46 (block 210), described in more detail with reference to FIG. 3.

If there are not enough available type-1 credits to assign a given amount of the available type-1 credits to the received packet 30, at a decision block 212, the level one meter 40 determines if there are enough available type-2 credits to assign a given amount of the available type-2 credits to the received packet 30. If there are enough available type-2 credits to assign a given amount of the available type-2 credits to the received packet 30, the level one meters 40 is configured to label the packet 30 with a type-2 label (block 214), reduce the number of available type-2 credits accordingly by the given amount of the available type-2 credits assigned to the received packet 30 (block 216), and forward the labeled packet 30 to the level two meter 46 (block 210), described in more detail with reference to FIG. 3.

If there are not enough available type-2 credits to assign a given amount of the available type-2 credits to the received packet 30, the level one meter 40 is configured to label the packet with a type-3 label (block 218) and drop the packet 30 (block 220). In some embodiments, the packet 30 labeled type-3 may be dropped by the queueing logic 48 at this point in the packet flow (i.e., after the level one meters 40 but before the level two meter 46) or the packet may be dropped later by the queueing logic 48 after flowing through the level two meter 46 which simply ignores the packet labeled type-3.

Reference is now made to FIG. 3, which is a flowchart 300 including steps in a method of operation of the level two meter 46 in the system 10 of FIG. 1.

In general, the level two meter 46 is configured to relabel the labeled packets 30 (received from the level one meters 40) based on a current labeling of the labeled packets 30 and available level-two-meter credits for label type-1 and label type-2. The level two meter 46 has its own allocation of level-one-meter credits for both type-1 and type-2 credits independent of the credits allocated to the level one meters 40. All the packets 30 processed by the level one meters 40 (with the possible exclusion of the packets labeled with a type-3 label) are generally provided as input to the level two meter 46.

Operation of the level two meter 46 is now described in more detail below with respect to one of the packets 30 processed by one of the level one meters 40 and provided to the level two meter 46.

The level two meter 46 is configured to receive the labeled packet 30 (block 302). At a decision block 304, the level two meter 46 is configured to determine if the labeled packet 30 is labeled with a type-1 label. If the labeled packet 30 is labeled with a type-1 label, at a decision block 306, the level two meter 46 determines if there are enough available type-1 credits to assign a given amount of the available type-1 credits to the labeled packet 30. For example, if the credits are bandwidth based, then the level two meter 46 compares the size of the packet 30 with the value of the available type-1 credits. If the value of the available type-1 credits is greater than the size of the packet 30, then there are enough available type-1 credits to assign a given amount of the available type-1 credits to the packet 30. If the credits are tokens corresponding to packets or places in the multiplex network receive queue 24, then if the value of the available type-1 credits is greater than zero, then there are enough available type-1 credits to assign 1 credit to the packet 30.

If there are enough available type-1 credits to assign a given amount of the available type-1 credits to the packet 30, the level two meter 46 is configured to relabel the packet 30 with a type-1 label (block 308), and reduce the number of available type-1 credits accordingly by the given amount of the available type-1 credits assigned to the packet 30 (block 310), and the queueing logic 48 is configured to add the relabeled packet 30 to the multiplex network receive queue 24 (block 312).

If there are not enough available type-1 credits to assign a given amount of the available type-1 credits to the packet 30 (which should not happen if the type-1 credits are correctly assigned, as will be described in more detail with reference to FIG. 4), at a decision block 314, the level two meter 46 determines if there are enough available type-2 credits to assign a given amount of the available type-2 credits to the labeled packet 30. If there are enough available type-2 credits to assign a given amount of the available type-2 credits to the labeled packet 30, the level two meter 46 is configured to relabel the packet 30 with a type-2 label (block 316), reduce the number of available type-2 credits accordingly by the given amount of the available type-2 credits assigned to the packet 30 (block 318), and the queueing logic 48 is configured to add the relabeled packet 30 to the multiplex network receive queue 24 (block 312).

If there are not enough available type-2 credits to assign a given amount of the available type-2 credits to the received packet 30, the level two meter 46 is configured to relabel the packet with a type-3 label (block 322) and drop the packet 30 (block 324). In some embodiments, the packet 30 relabeled type-3 may be dropped by the queueing logic 48.

If at decision block 304, the level two meter 46 determines that the labeled packet 30 is not labeled with a type-1 label, the level two meter 46 determines at a decision block 326 if the labeled packet 30 is labeled with a type-2 label. If the labeled packet 30 is labeled with a type-2 label, at decision block 314, the level two meter 46 determines if there are enough available type-2 credits to assign a given amount of the available type-2 credits to the labeled packet 30. If there are enough available type-2 credits to assign a given amount of the available type-2 credits to the labeled packet 30, the level two meter 46 is configured to relabel the packet 30 with a type-2 label (block 316), reduce the number of available type-2 credits accordingly by the given amount of the available type-2 credits assigned to the packet 30 (block 318), and the queueing logic 48 is configured to add the relabeled packet 30 to the multiplex network receive queue 24 (block 312). If there are not enough available type-2 credits to assign a given amount of the available type-2 credits to the received packet 30, the level two meter 46 is configured to label the packet with a type-3 label (block 322) and drop the packet 30 (block 324). In some embodiments, the packet 30 labeled type-3 may be dropped by the queueing logic 48.

If at decision block 326, the level two meter 46 determines that the labeled packet 30 is not labeled with a type-2 label, the level two meter 46 is configured to relabel the packet with a type-3 label (block 322) or ignore the packet, and drop the packet 30 (block 324). In some embodiments, the packet 30 labeled type-3 may be dropped by the queueing logic 48.

Figure 4:
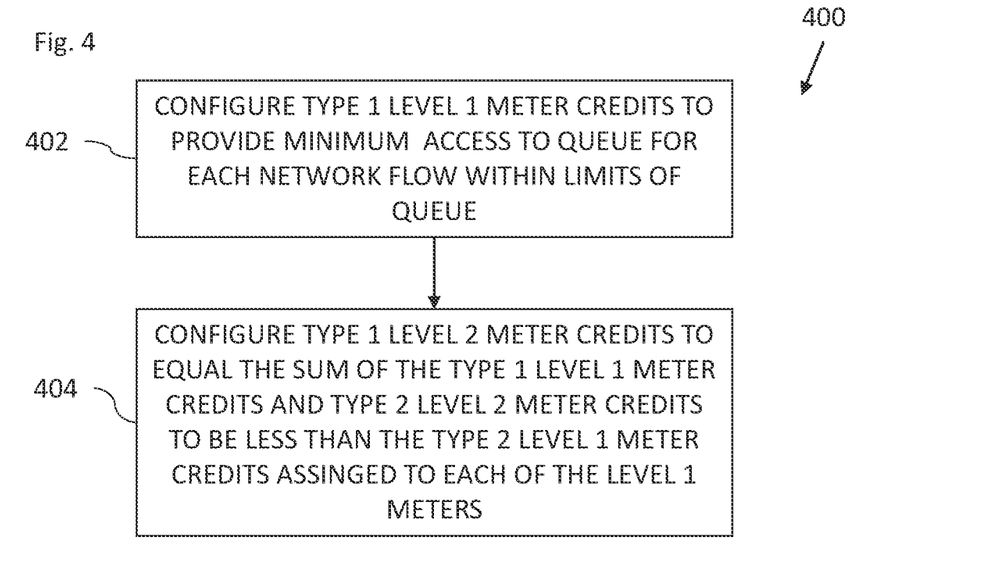
FIG. 4 is a flowchart including steps in a method of setting credit levels in the system of FIG. 1.

Reference is now made to FIG. 4, which is a flowchart 400 including steps in a method of setting credit levels in the system 10 of FIG. 1. As previously mentioned, each of the level one meters 40 is assigned a number of type-1 credits and a number of type-2 credits. Similarly, the level two meter 46 is assigned a number of type-1 credits and a number of type-2 credits. In some embodiments, the credits are replenished periodically as described in more detail with reference to FIG. 5. In other embodiments, the credits are replenished when packets are consumed from the multiplex network receive queue 24, for example, by the VM 20 or the VM 22, as described in more detail with reference to FIG. 6.

For example, the multiplex network receive queue 24 has a capacity of Z, where Z could be a bandwidth limit of, or a number of packets or places in, the multiplex network receive queue 24. If there are N level one meters 40, each level one meter 40 could be assigned X type-1 credits and Y type-2 credits, where X plus Y equals Z. The credits for the level two meter 46 may be assigned as follows. The type-1 credits may be set to equal N times X, and the type-2 credits may be set to equal Z minus (N times X). In this manner each of the network flows from the remote nodes will be guaranteed minimal access to the multiplex network receive queue 24 defined by the credit limit of X. The packets labeled type-1 by the level one meters 40 will typically retain the type-1 label after processing (i.e., relabeling) by the level two meter 46, while some of the packets labeled type-2 will be relabeled as type-3 by the level two meter 46 and dropped.

Therefore, in some embodiments, the packet processing circuitry 28 is configured to configure (i.e., to initially set, and subsequently maintain by replenishing) the number of the available type-1 level-one-meter credits (for each level one meter 40) to provide a minimum access to the multiplex network receive queue 24 for each of the network flows within the limits of the multiplex network receive queue 24 (block 402). The packet processing circuitry 28 is also configured to: (1) configure (i.e., to initially set, and subsequently maintain by replenishing) the number of the available type-1 credits for the level two meter 46 to equal the sum of the type-1 level-one-meter credits; (2) configure (i.e., to initial set, and subsequently maintain by replenishing) the number of available type-2 credits for the level two meter 46 to be less than the type-2 credits assigned to each of the level one meters 40 (block 404).

Therefore, in some embodiments, the packet processing circuitry 28 is configured to configure (i.e., to initially set, and subsequently maintain by replenishing) a number of the available level-one-meter credits and the available level-two-meter credits so that the packets 30 labeled with a type-1 label by the level one meters 40 retain the type-1 label after the relabeling by the level two meter 46. As a result of the above, the packet processing circuitry 28 is configured to configure (i.e., to initially set, and subsequently maintain by replenishing) the available level-one-meter credits and the available level-two-meter credits so that some of the packets labeled with a type-2 label by the level one meters 40 are relabeled with a type-3 label by the level two meter 46.

In such a manner, the hierarchical policer 38 is configured to provide queue fairness for the network flows so that each network flow competing for access to the multiplex network receive queue 24 is provided at least a minimal access to the multiplex network receive queue 24 based on packets labeled with a type-1 label by the level one meters 40 retaining the type-1 label after relabeling by the level two meter 46.

Figure 5:
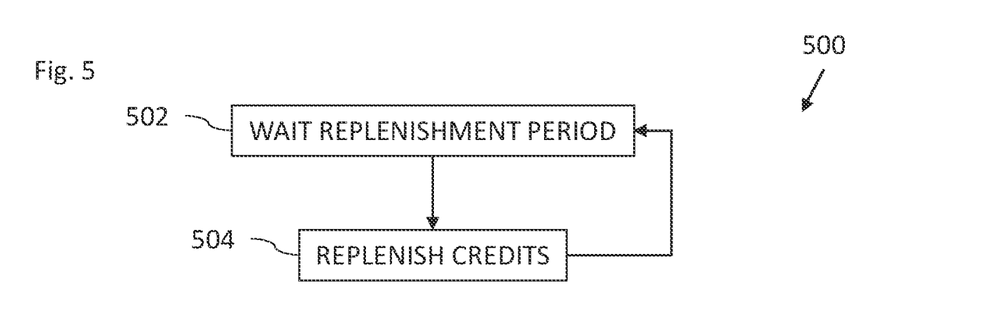
FIG. 5 is a flowchart including steps in a method of replenishing credits in the system of FIG. 1.

Reference is now made to FIG. 5, which is a flowchart 500 including steps in a method of replenishing credits in the system 10 of FIG. 1. In some embodiments, the hierarchical policer 38 is configured as a bandwidth policer in which the packets 30 are labeled with the different label types according to bandwidth limits. The packet processing circuitry 28 is configured to consume the available level-one-meter credits and the available level-two-meter credits according to a bandwidth of the packets. For example, if a packet has a size A and is labeled as type-1 by one of the level one meter 40, then the available type-1 credits for that level one meter 40 is reduced by A.

The packet processing circuitry 28 is configured to set the type-1 and type-2 label credit limits for each of the level one meters 40 and the level two meter 46. Once the hierarchical policer 38 is operating, the packet processing circuitry 28 is configured to periodically replenish the available level-one-meter credits (type-1 and type-2) and the available level-two-meter credits (type-1 and type-2). The packet processing circuitry 28 is configured to wait a period of time equal to the replenishment period (e.g., 1 second) (block 502), and replenish the credits (type-1 and type-2) of each of the level one meters 40, and the level two meter 46 (block 504).

For example, one of the level one meters 40 may label packets as type-1 at a rate of X GB/s and as type-2 at a rate of Y GB/s based on an estimation that the packets 30 in the multiplex network receive queue 24 are processed at a rate of Z GB/s (where Z=X+Y). In such a case, X type-1 credits and Y type-2 credits may be assigned to that level one meter 40 per second (for example) so that the above labeling rates between type-1 and type-2 may be achieved by that level one meter 40. The same may be applied to the other level one meters 40. In a similar manner, but with different limits, the credits may be assigned to the level two meter 46. For example, N times X type-1 credits may be assigned per second, and Z minus (N times X) type-2 credits may be assigned per second.

Figure 6:
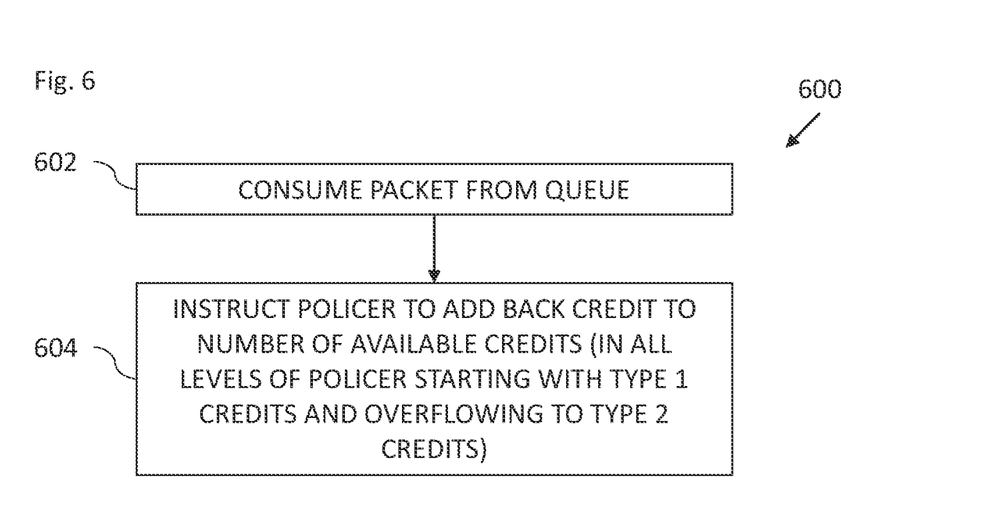
FIG. 6 is a flowchart including steps in an alternative method of replenishing credits in the system of FIG. 1.

Reference is now made to FIG. 6, which is a flowchart 600 including steps in an alternative method of replenishing credits in the system 10 of FIG. 1. In some embodiments, the packet processing circuitry 28 is configured to consume the available level-one-meter credits and the available level-two-meter credits according to a number of packets or places in the multiplex network receive queue 24. For example, if a packet is received and labeled as type-1 by one of the level one meters 40, then the available type-1 credits for that level one meter 40 is reduced by 1. If a packet is received and labeled as type-2 by one of the level one meter 40, then the available type-2 credits for that level one meter 40 is reduced by 1. If a packet is received and relabeled by the level two meter 46 with label type-1 or type-2 the available type-1 or type-2 credits are reduced by 1, respectively.

The credits are generally not replenished periodically. The credits are generally replenished when the packets 30 are consumed from the multiplex network receive queue 24, e.g., by one of the VMs (block 602). If a packet is consumed, the processor 16 commands the packet processing circuitry 28 to add back a credit to the level two meter 46 and the level one meter 40 from which the packet originated. The level one meter 40 from which the packet originated may be determined based on the network flow to which the packet belongs based on data in the header of the packet. The packet processing circuitry 28 tries to add back a credit to the type-1 credits for the level two meter 46. If the type-1 credits of the level two meter 46 are full (i.e., at their initial value), the packet processing circuitry 28 adds back a credit to the type-2 credits for the level two meter 46. Similarly, the packet processing circuitry 28 tries to add back a credit to the type-1 credits for the level one meter 40 from which the packet originated. If the type-1 credits of the level one meter 40 from which the packet originated are full (i.e., at their initial value), the packet processing circuitry 28 adds back a credit to the type-2 credits for the level one meter 40 from which the packet originated.

Therefore, the packet processing circuitry 28 is configured to add back consumed level-one-meter credits and level-two-meter credits responsively to respective packets 30 being consumed from the multiplex network receive queue 24 (block 604), e.g., by respective ones of the VMs.

Figure 7:
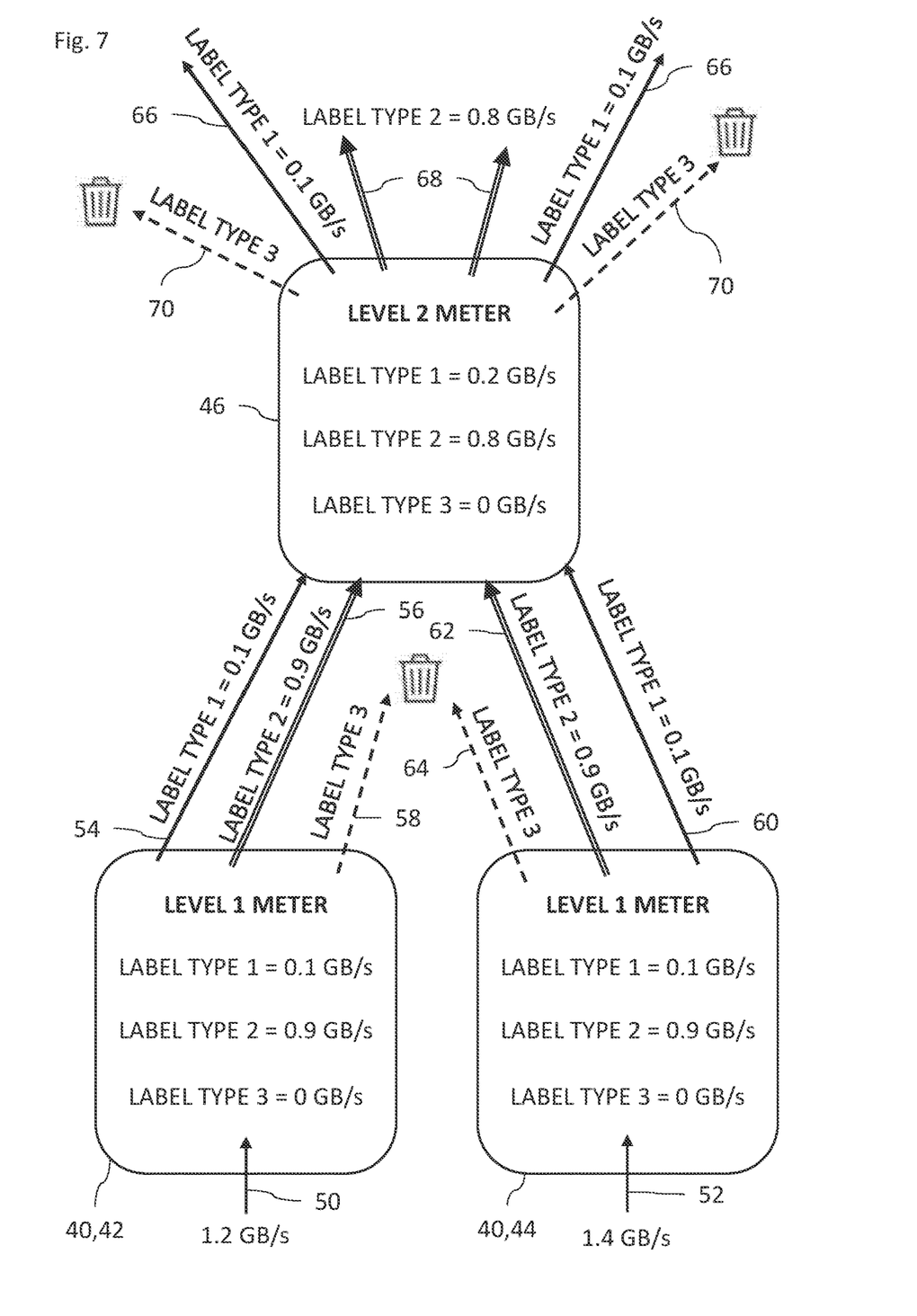
FIGS. 7-9 are block diagram views of a hierarchical policer in the system of FIG. 1 showing example labeling.
Figure 8:
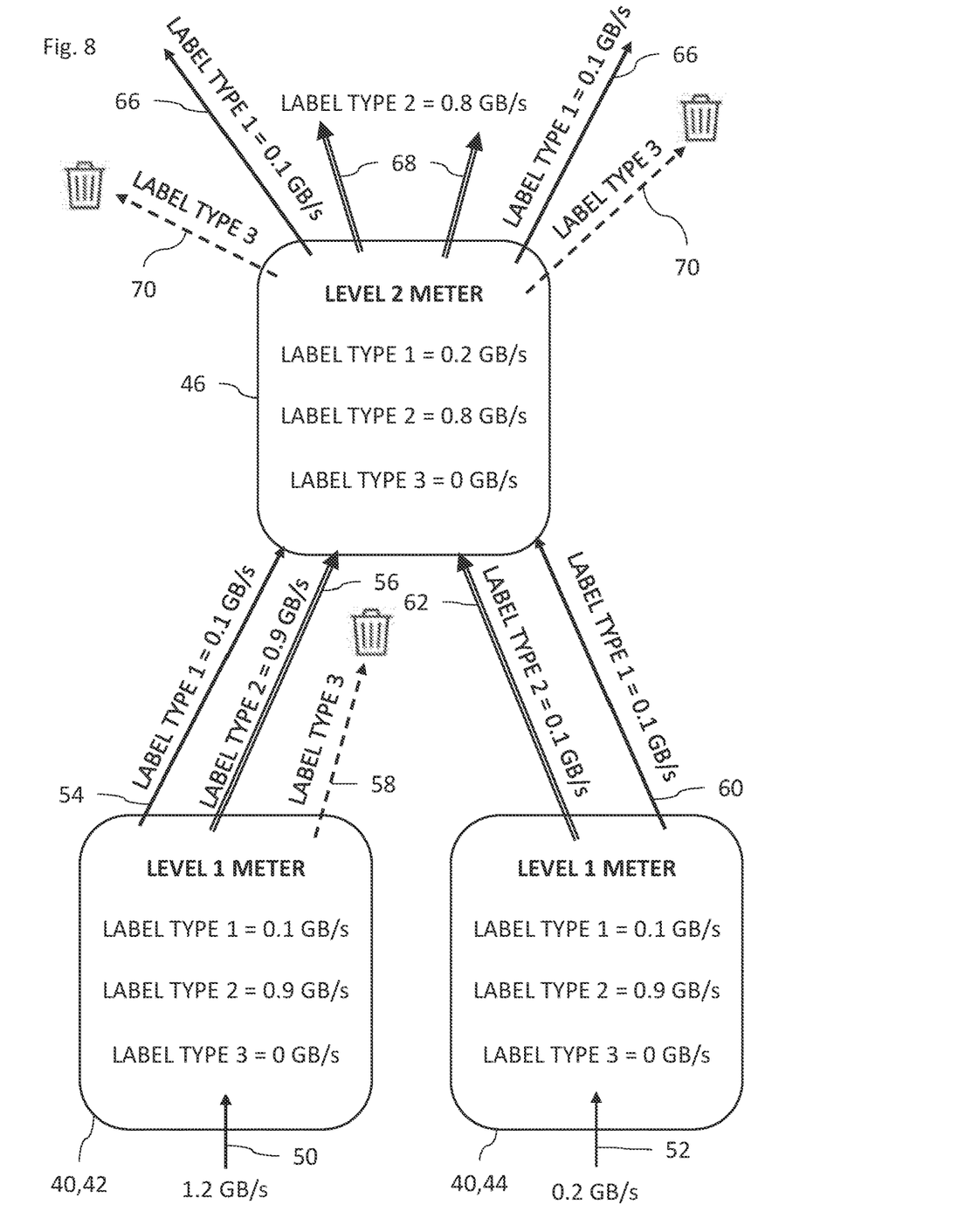
Figure 9:
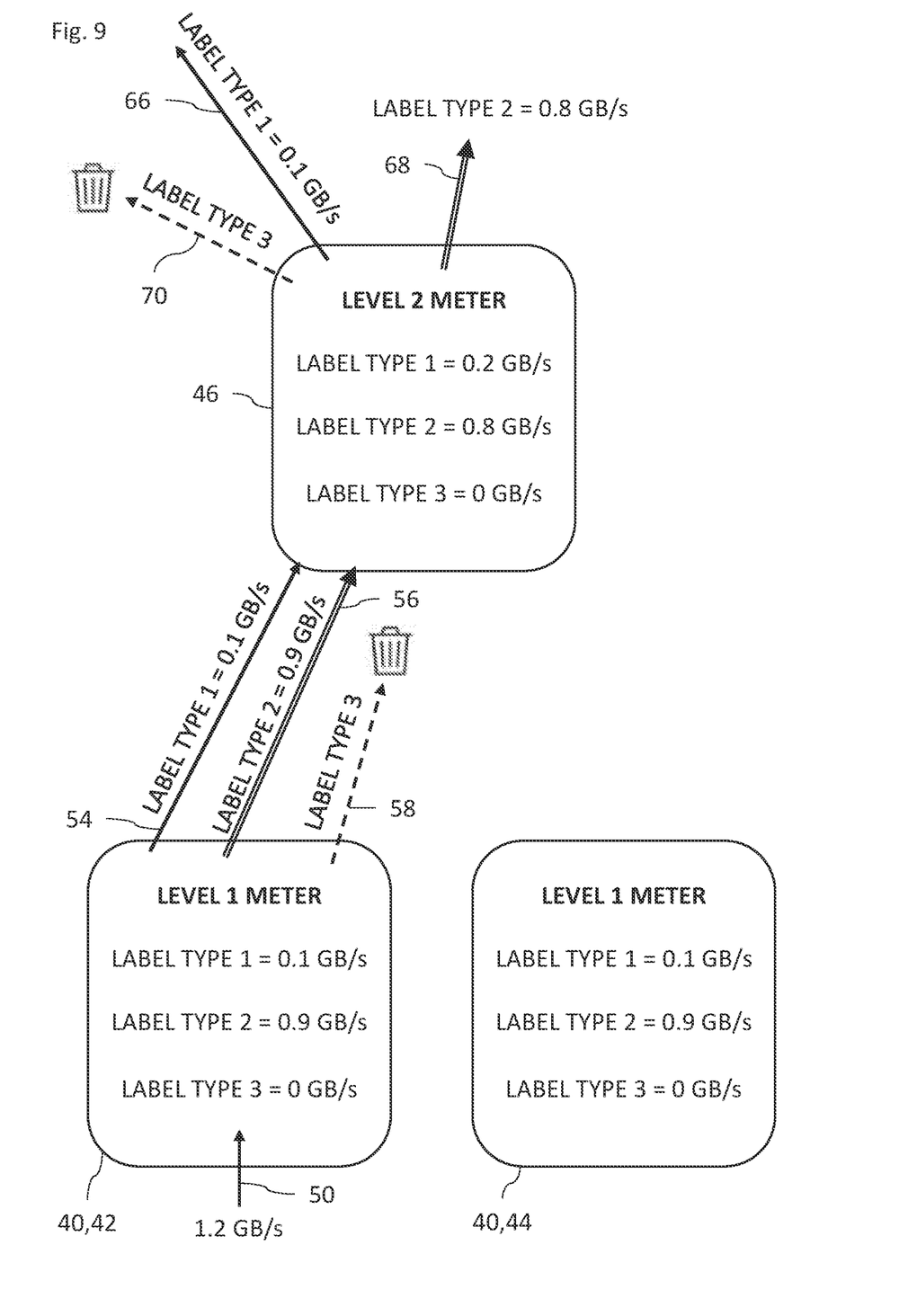

Reference is now made to FIGS. 7-9, which are block diagram views of the hierarchical policer 38 in the system 10 of FIG. 1 showing example labeling.

FIGS. 7-9 show the same credit levels and replenishment rates being used but with different bandwidth network flows entering the level one meters 40. In the example of FIGS. 7-9, the multiplex network receive queue 24 has a bandwidth limit of 1 GB/s. Therefore, the credit limits for the level one meters 40 and the level two meter 46 are set accordingly as follows. Each of the level one meters 40 has a type-1 label credit limit of 0.1 GB/s, so 0.1 GB of credits are assigned to each level one meter 40 for type-1 labels per second. Each of the level one meters 40 has a type-2 label credit limit of 0.9 GB/s, so 0.9 GB of credits are assigned to each level one meter 40 for type-2 labels per second.

The level two meter 46 has a type-1 label credit limit of 0.2 GB/s, so 0.2 GB of credits are assigned to the level two meter 46 for type-1 labels per second. The level two meter 46 has a type-2 label credit limit of 0.8 GB/s, so 0.8 GB of credits are assigned to the level two meter 46 for type-2 labels per second.

FIG. 7 shows that the bandwidth of a network flow 50 entering level one meter 42 is 1.2 GB/s and the bandwidth of a network flow 52 entering level one meter 44 is 1.4 GB/s. FIG. 7 shows that of the network flow 50 entering the level one meter 42, 0.1 GB of packets are labeled as type-1 per second (line 54), 0.9 GB are labeled as type-2 per second (line 56), and the remainder 0.2 GB are labeled as type-3 per second (line 58). The packets labeled as type-1 and type-2 by the level one meter 42 are forwarded to the level two meter 46 while the packets labeled as type-3 are dropped.

Similarly, FIG. 7 shows that of the network flow 52 entering the level one meter 44, 0.1 GB of packets are labeled as type-1 per second (line 60), 0.9 GB are labeled as type-2 per second (line 62), and the remainder 0.4 GB are labeled as type-3 per second (line 64). The packets labeled as type-1 and type-2 by the level one meter 44 are forwarded to the level two meter 46 while the packets labeled as type-3 are dropped.

FIG. 7 shows that of the packets entering the level two meter 46, 0.2 GB of the packets labeled as type-1 are relabeled (i.e., retained) as type-1 per second (lines 66) (0.1 GB/s of the packets from level one meter 42 and 0.1 GB/s of the packets from level one meter 44). Of the 1.8 GB of packets labeled as type-2 entering the level two meter 46 per second, 0.8 GB of these packets are relabeled (i.e., retained) as type-2 per second (lines 68), while 1 GB of these packets are relabeled as type-3 per second (lines 70). The type-1 and type-2 packets exiting the level two meter 46 are added to the multiplex network receive queue 24 by the queueing logic 48, while the type-3 packets are dropped.

FIG. 8 shows that the bandwidth of a network flow 50 entering level one meter 42 is 1.2 GB/s and the bandwidth of a network flow 52 entering level one meter 44 is 0.2 GB/s. FIG. 8 shows that of the network flow 50 entering the level one meter 42, 0.1 GB of packets are labeled as type-1 per second (line 54), 0.9 GB are labeled as type-2 per second (line 56), and the remainder 0.2 GB are labeled as type-3 per second (line 58). The packets labeled as type-1 and type-2 by the level one meter 42 are forwarded to the level two meter 46 while the packets labeled as type-3 are dropped.

Similarly, FIG. 8 shows that of the network flow 52 entering the level one meter 44, 0.1 GB of packets are labeled as type-1 per second (line 60) and 0.1 GB are labeled as type-2 per second (line 62). The packets labeled as type-1 and type-2 by the level one meter 44 are forwarded to the level two meter 46.

FIG. 8 shows that of the packets entering the level two meter 46, 0.2 GB of the packets labeled as type-1 are relabeled (i.e., retained) as type-1 per second (lines 66) (0.1 GB/s of the packets from level one meter 42 and 0.1 GB/s of the packets from level one meter 44). Of the 1 GB of packets labeled as type-2 entering the level two meter 46 per second, 0.8 GB of these packets are relabeled (i.e., retained) as type-2 per second (lines 68), while 0.2 GB of these packets are relabeled as type-3 per second (lines 70). The type-1 and type-2 packets exiting the level two meter 46 are added to the multiplex network receive queue 24 by the queueing logic 48, while the type-3 packets are dropped.

FIG. 9 shows that the bandwidth of a network flow 50 entering level one meter 42 is 1.2 GB/s and the bandwidth of a network flow 52 entering level one meter 44 is 0 GB/s (i.e., no packets). FIG. 9 shows that of the network flow 50 entering the level one meter 42, 0.1 GB of packets are labeled as type-1 per second (line 54), 0.9 GB are labeled as type-2 per second (line 56), and the remainder 0.2 GB are labeled as type-3 per second (line 58). The packets labeled as type-1 and type-2 by the level one meter 42 are forwarded to the level two meter 46 while the packets labeled as type-3 are dropped.

FIG. 9 shows that of the packets entering the level two meter 46, 0.1 GB of the packets labeled as type-1 are relabeled (i.e., retained) as type-1 per second (line 66). Of the 0.9 GB of packets labeled as type-2 entering the level two meter 46 per second, 0.8 GB of these packets are relabeled (i.e., retained) as type-2 per second (line 68), while 0.1 GB of these packets are relabeled as type-3 per second (line 70). The type-1 and type-2 packets exiting the level two meter 46 are added to the multiplex network receive queue 24 by the queueing logic 48, while the type-3 packets are dropped.

Figure 10:
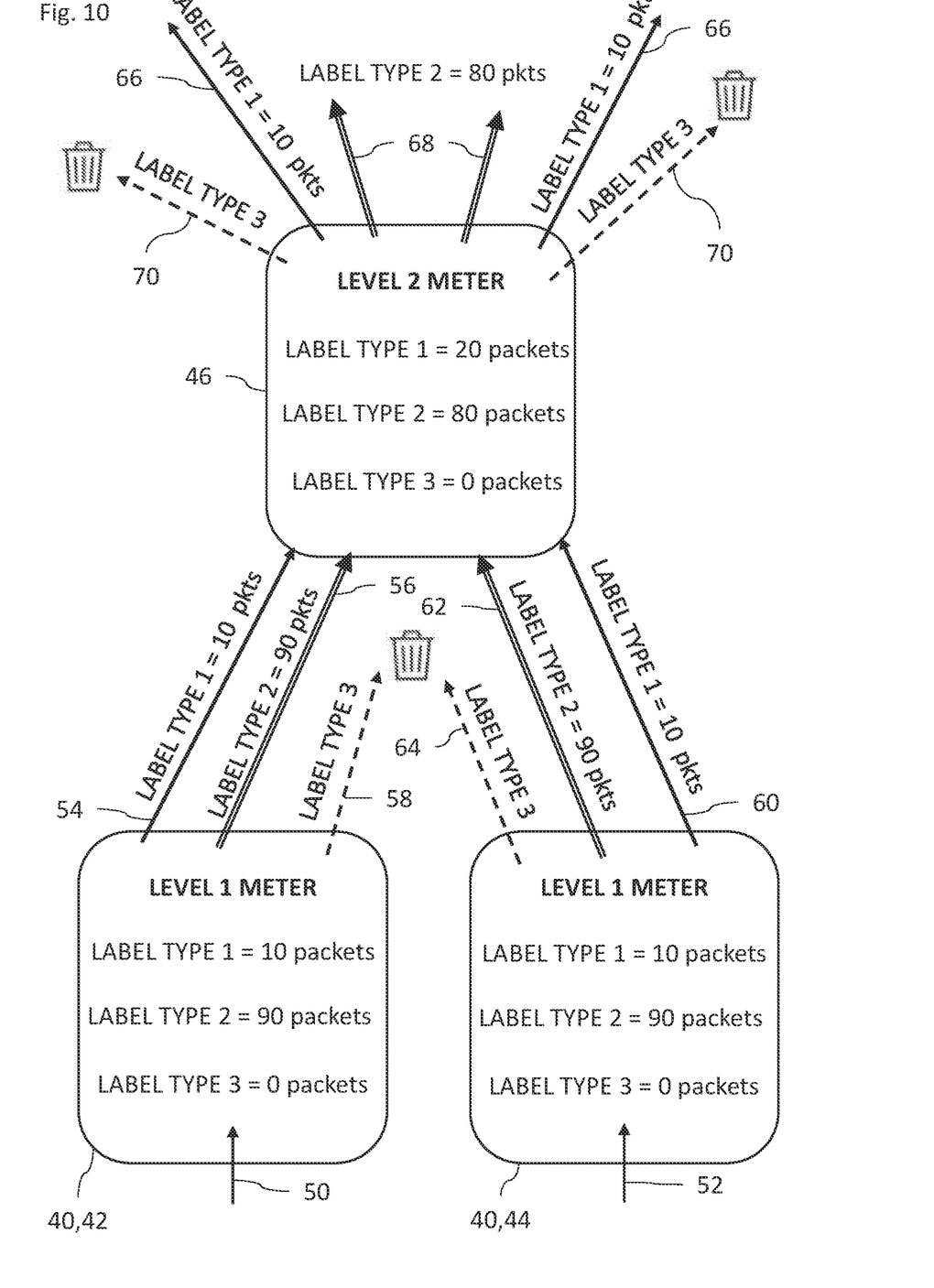
FIGS. 10-11 are block diagram views of an alternative hierarchical policer in the system of FIG. 1 showing example labeling.
Figure 11:
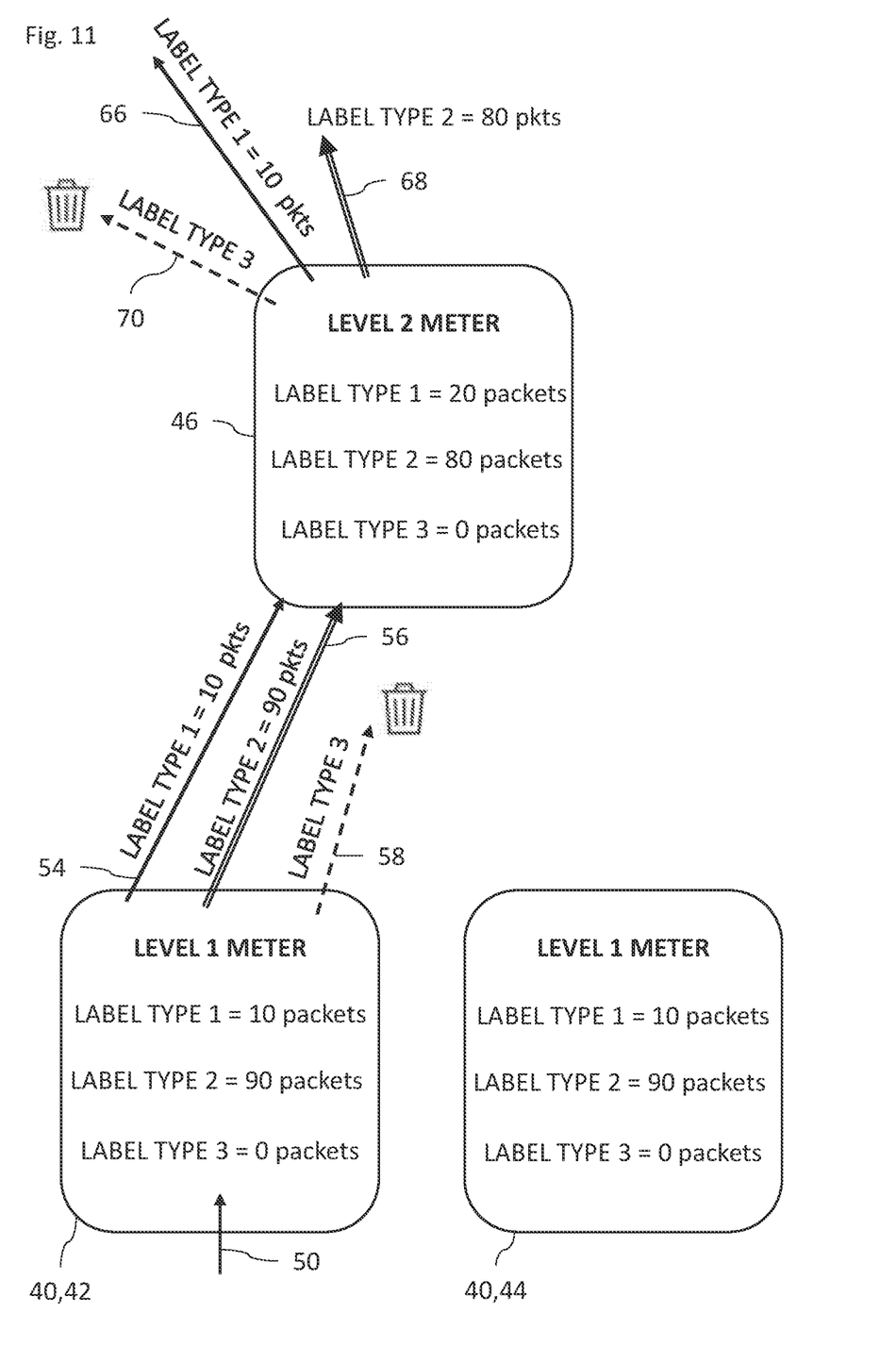

Reference is now made to FIGS. 10-11, which are block diagram views of the hierarchical policer 38 in the system 10 of FIG. 1 showing example labeling in which credits are consumed per packet or per place in the multiplex network receive queue 24.

FIGS. 10-11 show the same credit levels but with different network flows loads entering the level one meters 40. In the examples of FIGS. 10-11, the multiplex network receive queue 24 has a capacity for 100 packets. Therefore, the credit limits for the level one meters 40 and the level two meter 46 are set accordingly as follows. Each of the level one meters 40 has 10 type-1 label credits and 90 type-2 label credits. The level two meter 46 has 20 type-1 label credits and 80 type-2 label credits.

FIG. 10 shows that network flow 50 is entering level one meter 42 and the network flow 52 is entering level one meter 44. FIG. 10 shows that of the network flow 50 entering the level one meter 42, 10 packets are labeled as type-1 (line 54), 90 packets are labeled as type-2 (line 56), and the remainder of the packets are labeled as type-3 (line 58) by the level one meter 42. The packets labeled as type-1 and type-2 by the level one meter 42 are forwarded to the level two meter 46 while the packets labeled as type-3 are dropped.

Similarly, FIG. 10 shows that of the network flow 52 entering the level one meter 44, 10 packets are labeled as type-1 (line 60), 90 packets are labeled as type-2 (line 62), and the remainder of the packets are labeled as type-3 (line 64) by the level one meter 44. The packets labeled as type-1 and type-2 by the level one meter 44 are forwarded to the level two meter 46 while the packets labeled as type-3 are dropped.

FIG. 10 shows that of the packets entering the level two meter 46, 20 packets labeled as type-1 are relabeled (i.e., retained) as type-1 (lines 66) by the level two meter 46 (10 packets from level one meter 42, and 10 packets from level one meter 44). Of the 180 packets labeled as type-2 entering the level two meter 46, 80 packets are relabeled (i.e., retained) as type-2 (lines 68) by the level two meter 46, while the remaining 100 packets are relabeled as type-3 (lines 70) by the level two meter 46. The type-1 and type-2 packets exiting the level two meter 46 are added to the multiplex network receive queue 24 by the queueing logic 48, while the type-3 packets are dropped.

FIG. 11 shows that network flow 50 is entering level one meter 42, but there is no network flow entering level one meter 44. FIG. 10 shows that of the network flow 50 entering the level one meter 42, 10 packets are labeled as type-1 (line $4), 90 packets are labeled as type-2 (line 56), and the remainder of the packets are labeled as type-3 (line 58) by the level one meter 42. The packets labeled as type-1 and type-2 by the level one meter 42 are forwarded to the level two meter 46 while the packets labeled as type-3 are dropped.

FIG. 11 shows that of the packets entering the level two meter 46, 10 packets labeled as type-1 are relabeled (i.e., retained) as type-1 per second (line 66). Of the 90 packets labeled as type-2 entering the level two meter 46, 80 packets are relabeled (i.e., retained) as type-2 (line 68) by the level two meter 46, while the remaining 10 packets are relabeled as type-3 (line 70) by the level two meter 46. The type-1 and type-2 packets exiting the level two meter 46 are added to the multiplex network receive queue 24 by the queueing logic 48, while the type-3 packets are dropped.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A network device, comprising:
a network interface to receive packets over a packet data network; and
packet processing circuitry to manage a multiplex network receive queue, and including a hierarchical policer to provide queue fairness for a plurality of network flows competing for access to the multiplex network receive queue, the hierarchical policer including:
a plurality of level one meters to label the received packets with corresponding labels selected from labels of three label-types based on available level-one-meter credits for a first label-type and a second label-type, a first level one meter of the level one meters being to selectively label packets of a first network flow according to the three label-types, a second level one meter of the level one meters being to selectively label packets of a second network flow according to the three label-types;
a level two meter to receive at least some of the labeled packets output by the level one meters and relabel the at least some labeled packets based on a current labeling of the labeled packets and available level-two-meter credits for the first label-type and the second label-type; and
queueing logic to selectively: add the packets labeled with the first label-type or the second label-type of the three label-types to the multiplex network receive queue; and drop the packets labeled with a third label-type of the three label-types, the packet processing circuitry being to configure a number of the available level-one-meter credits and the available level-two-meter credits so that the packets labeled with the first label-type by the level one meters retain the first label-type after the relabeling by the level two meter.

2. The device according to claim 1, wherein the hierarchical policer is to provide the queue fairness for the network flows so that each of the network flows competing for access to the multiplex network receive queue is provided at least a minimal access to the multiplex network receive queue.

3. The device according to claim 1, wherein the packet processing circuitry is to consume the available level-one-meter credits and the available level-two-meter credits according to a bandwidth of the packets.

4. The device according to claim 3, wherein the packet processing circuitry is to periodically replenish the available level-one-meter credits and the available level-two-meter credits.

5. The device according to claim 1, wherein the packet processing circuitry is to consume the available level-one-meter credits and the available level-two-meter credits according to a number of the packets.

6. The device according to claim 5, wherein the packet processing circuitry is to add back consumed ones of the level-one-meter credits and the level-two-meter credits responsively to respective ones of the packets being consumed from the multiplex network receive queue.

7. The device according to claim 1, wherein the hierarchical policer is to provide the queue fairness for the network flows so that each of the network flows competing for access to the multiplex network receive queue is provided at least a minimal access to the multiplex network receive queue based on packets labeled with the first label-type by the level one meters retaining the first label-type after the relabeling by the level two meter.

8. The device according to claim 1, wherein the packet processing circuitry is to configure the available level-one-meter credits and the available level-two-meter credits so that some of the packets labeled with the second label-type by the level one meters are relabeled with the third label-type by the level two meter.

9. A network method, comprising:
receiving packets over a packet data network;
managing a multiplex network receive queue;
providing queue fairness for a plurality of network flows competing for access to the multiplex network receive queue using a hierarchical policer;
labeling the received packets with corresponding labels selected from labels of three label-types by a plurality of level one meters including a first level one meter and a second level one meter, the labeling including labeling the received packets according to the three label-types based on available level-one-meter credits for a first label-type and a second label-type;
selectively labeling packets of a first network flow according to the three label-types by the first level one meter;
selectively labeling packets of a second network flow according to the three label-types by the second level one meter;
receiving at least some of the labeled packets output by the level one meters;
relabeling the at least some labeled packets, the relabeling including relabeling some of the labeled packets based on a current labeling of the labeled packets and available level-two-meter credits for the first label-type and the second label-type;
configuring a number of the available level-one-meter credits and the available level-two-meter credits so that the packets labeled with the first label-type by the level one meters retain the first label-type after the relabeling by the level two meter; and
selectively adding the packets labeled with the first label-type or the second label-type of the three label-types to the multiplex network receive queue and dropping the packets labeled with a third label-type of the three label-types.

10. The method according to claim 9, wherein the providing includes providing the queue fairness for the network flows so that each of the network flows competing for access to the multiplex network receive queue is provided at least a minimal access to the multiplex network receive queue.

11. The method according to claim 9, further comprising consuming the available level-one-meter credits and the available level-two-meter credits according to a bandwidth of the packets.

12. The method according to claim 11, further comprising periodically replenishing the available level-one-meter credits and the available level-two-meter credits.

13. The method according to claim 9, further comprising consuming the available level-one-meter credits and the available level-two-meter credits according to a number of the packets.

14. The method according to claim 13, further comprising adding back consumed ones of the level-one-meter credits and the level-two-meter credits responsively to respective ones of the packets being consumed from the multiplex network receive queue.

15. The method according to claim 9, wherein the providing includes providing the queue fairness for the network flows so that each of the network flows competing for access to the multiplex network receive queue is provided at least a minimal access to the multiplex network receive queue based on packets labeled with the first label-type by the level one meters retaining the first label-type after the relabeling by the level two meter.

16. The method according to claim 9, wherein the configuring includes configuring the available level-one-meter credits and the available level-two-meter credits so that some of the packets labeled with the second label-type by the level one meters are relabeled with the third label-type by the level two meter.

17. A network device, comprising:
a network interface to receive packets over a packet data network; and
packet processing circuitry to manage a multiplex network receive queue, and including a hierarchical policer to provide queue fairness for a plurality of network flows competing for access to the multiplex network receive queue, the hierarchical policer including:
a plurality of level one meters to label the received packets with corresponding labels selected from labels of three label-types based on available level-one-meter credits for a first label-type and a second label-type, a first level one meter of the level one meters being to selectively label packets of a first network flow according to the three label-types, a second level one meter of the level one meters being to selectively label packets of a second network flow according to the three label-types;

a level two meter to receive at least some of the labeled packets output by the level one meters and relabel the at least some labeled packets based on a current labeling of the labeled packets and available level-two-meter credits for the first label-type and the second label-type; and queueing logic to selectively: add the packets labeled with the first label-type or the second label-type of the three label-types to the multiplex network receive queue; and drop the packets labeled with a third label-type of the three label-types, wherein the packet processing circuitry is to:

consume the available level-one-meter credits and the available level-two-meter credits according to a number of the packets; and add back consumed ones of the level-one-meter credits and the level-two-meter credits responsively to respective ones of the packets being consumed from the multiplex network receive queue.

\* \* \* \* \*